Jan. 15, 1935.  J. BING  1,988,413

FRICTION COUPLING

Filed Feb. 11, 1931

Inventor
Julius Bing,
by John O. Grady
Attorney

Patented Jan. 15, 1935

1,988,413

UNITED STATES PATENT OFFICE 1,988,413

FRICTION COUPLING

Julius Bing, Berlin, Germany, assignor to Magnet-Werke G. m. b. H., Eisenach, Germany, a company of Germany Application February 11, 1931, Serial No. 515,117
In Germany February 15, 1930

13 Claims. (Cl. 192—150)

With friction couplings, in particular those for large outputs, there exists the defect that with long continued heavy over-loading the friction surfaces burn in consequence of the slipping under heavy pressure which occurs under this condition, if the coupling is not quickly disengaged. Slipping which continues only for short periods, such as is caused by small variations of output or loading, or the slower sliding of the friction surfaces due to negligible overloading is generally permissible for relieving the driving gear of load variations, and is also of little harm to the friction surfaces if these are correctly dimensioned. On the other hand, any long continued heavy overloading must be avoided in order to spare the friction surfaces. This condition is satisfied at present by disengaging the coupling by hand. As such overloads, however, frequently occur suddenly, the disengagement by hand often takes place too late to be able to prevent the burning of the friction surfaces.

The invention provides means, which automatically disengages the coupling, actuated by the heat developed by the slipping of the friction surfaces. For example, in the case of electromagnetic couplings, such means preferably comprises a thermostat or the like in the direct vicinity of the friction surfaces, and actuating an electrical contact connected with a circuit containing a relay which interrupts the current circuit energizing the coupling.

Figure 1:
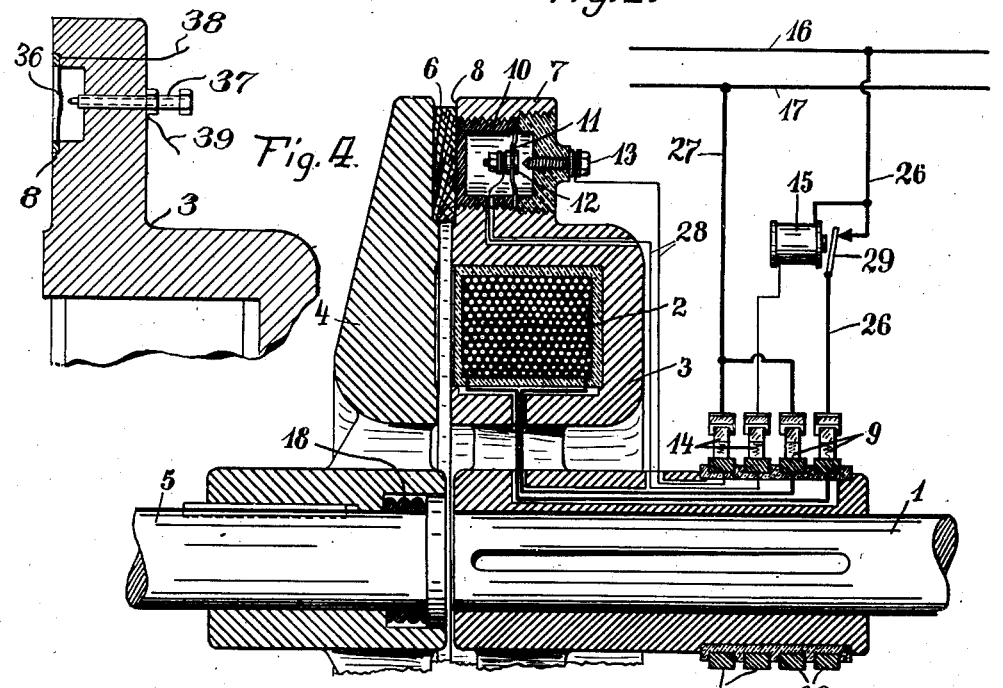
Figures 2, 3:
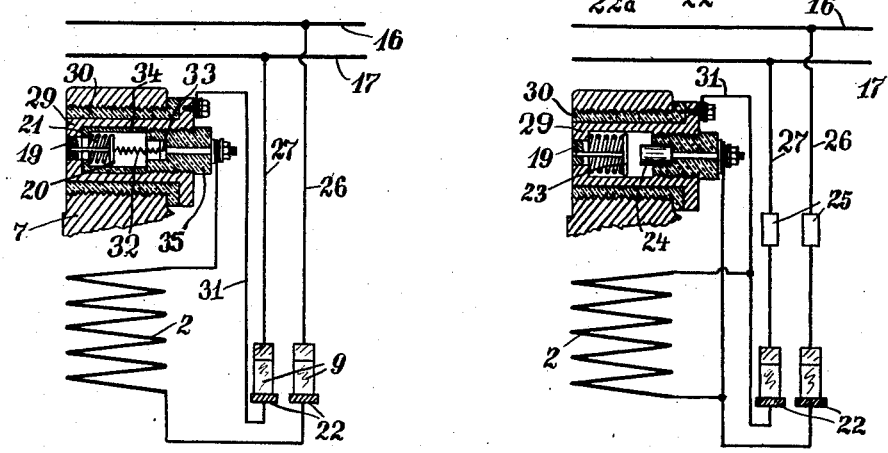

The attached drawing illustrates by way of example embodiments of the invention applied to friction couplings actuated electromagnetically. Fig. 1 shows a partial axial section through such a coupling, having disengaging means actuated by a pressure vessel. Figs. 2 and 3 show diagrammatically two different electrical circuits with disengaging means actuated by fusible plugs. Fig. 4 shows diagrammatically a bimetallic thermo-element serving as disengaging means.

On the shaft 1, which may be regarded as the driving shaft, is keyed, as shown in Fig. 1, the coupling body 3 containing the magnet winding 2, while the armature 4 co-operating with the magnet body is fixed on the driven shaft 5 in such manner that it can shift in the axial direction but cannot rotate relatively thereto. The friction lining indicated by 6, is in the present case fitted on the armature disc 4, and engages with the metallic friction surface 8 provided on the oppositely situated flange part 7 of the magnet body 3, when energizing current supplied from the power supply wires 16, 17 through branch wires 26, 27, brushes 9, and slip rings 22, draws the armature disc against the magnet body. In the flange part 7 is inserted a metallic pressure vessel 10. In the present case the vessel is screwed in from the outside, in such manner that the inner surface of the vessel, consisting preferably of good conducting metal as for example copper, is level with the friction surface 8. The air space of the vessel is closed by a diaphragm 11 carrying a small contact plate 12 which can come into contact with an adjustable contact screw 13, when the diaphragm 11, in consequence of the expansion caused by heating of the air enclosed in the vessel, moves outwards. In this manner, a current circuit is completed through branch wire 27, wires 28, brushes 14 and slip rings 22a to relay 15 which interrupts the energizing current supplied to the winding 2 by way of switch 29. The armature disc is thereupon released by the magnet body, and is moved along the shaft 5 by a compression spring 18, so that the friction surfaces part from each other and the coupling is disengaged.

The apparatus may be easily adjusted for any desired period of heating, so that it is possible to permit minor power or load variations of short duration without automatic disengagement of the coupling taking place, while overloads lasting longer, which would damage the friction surfaces by overheating, effect a rapid disengagement of the coupling.

As the vessel 10 is completely sealed, so that the contents thereof cannot escape, the action may be adapted for sensitiveness by adding small quantities of liquids of various boiling points to the vessel. For example, by the use of carbon disulphide, sulphuric ether or the like, a disengagement of the coupling may be attained at temperatures even below 50°. This is, under certain circumstances, of great importance in cases where the coupling is used in rooms in which inflammable substances are dealt with.

With electromagnetic couplings, a diaphragm vessel can be dispensed with and a direct switching off of the magnet winding can be effected by the heating of an easily fusible solder, in which a contact is held, as shown in Figs. 2 and 3.

In the embodiment shown in Fig. 2, a plug 19, readily fusible by heat, is located at the friction surface 8 in a conductive body 29 mounted in an insulating sleeve 30 in the flange 7 of coupling member 3. Energizing current for the magnet coil 2 is led from wire 17 through wire 27, one of the brushes 9, one of the slip rings 22 and wire 31 to the conductive body 29 and plug 19, which holds a contact 20. From the contact 20 current passes by way of the loose wire 32 to a terminal 33 and thence to the magnet coil 2. One end of a coil spring 21 abuts the head of contact 20, and the other end of the spring abuts an inner insulating sleeve 34, while the terminal 33 is mounted in an insulating plug 35. On the melting of the solder, the contact 20 is released and by action of the spring 21 is urged within the sleeve 34, so that interruption of the current supply to the energizing coil of the coupling is effected. As, according to the composition of the solder, the most diverse melting points can be obtained, this arrangement can also be easily suited to varied conditions.

Instead of the current interruption by means of this arrangement, a short circuit between the two slip rings through which the current supply to the coupling passes, may be produced as shown in Fig. 3. In this modified arrangement current is led to the magnet coil 2 through safety fuses 25 interposed in branch wires 26, 27. The heat sensitive device is of similar construction to that shown in Figure 2, except that the inner insulating sleeve 34 and the loose wire 32 are omitted. The contact 23 is thus always in connection with the conductive body 29 through spring 21, and only in electrical connection with terminal 24 when the plug 19 fuses and releases the contact 23. Current then passes from one slip ring 22 to the other through body 29, spring 21, contact 23, and terminal 24, shortcircuiting the magnet coil 2. The safety fuses 25 therefore operate, causing the energizing coil to lose current and the coupling to be disengaged.

Instead of the heat created by the slipping of the friction surfaces actuating the disengaging means by expansion of air in a pressure vessel, it can be utilized in a different manner for disengaging the coupling. For example, in Fig. 4 a bi-metallic thermo-element 36 of known construction is used, which, as soon as the heating reaches a definite value, becomes so distorted that it makes contact with a terminal 37, and through the wires 38, 39 actuates the relay 15 or equivalent in the same manner as the pressure vessel, thereby shutting off the current energizing the coil 2.

The heat-sensitive device does not need to be fitted directly on the friction surfaces of the coupling. It can be fitted at some other position, provided that the place in question undergoes a sufficiently rapid increase of temperature on the slipping of the friction clutch surfaces, in consequence of the heat thereby produced. The arrangement shown in Fig. 1 is particularly advantageous, since it is actuated not only by the heat transmitted to it by conduction, but by the direct heating of the metallic bottom of the vessel 10 exposed to the slipping of the friction clutch.

It will be obvious that the pressure vessel, bi-metallic thermostat, and fuses referred to are equivalent means for making or breaking an electric circuit on rise of temperature of the friction surfaces of the coupling, and any one of them may be used with any of the means shown and described for de-energizing of the magnet winding on the said circuit making or breaking means being caused to function.

These arrangements save the use of relays and simplify the construction of such automatically-disengaged couplings, so that they are particularly adapted for small couplings which must be produced cheaply.

I claim:—

1. A friction coupling comprising a driving body, a coaxially-disposed driven body, means for maintaining the bodies in frictional engagement, means for separating the bodies, and means for automatically releasing the engaging means and thereby enabling automatic operation of the separating means in the event of heating of the friction surfaces of the bodies due to slipping.

2. A friction coupling comprising a driving body and a driven body mounted for rotation with coaxially-disposed driving and driven shafts, means for maintaining the bodies in frictional engagement, means for separating the bodies, temperature sensitive means associated with one of the bodies, and means controlled by the sensitive means for releasing the engaging means and thereby enabling automatic operation of the separating means in the event of heating of the friction surfaces of the bodies due to slipping.

3. A friction coupling comprising a driving body and a driven body mounted for rotation with coaxially-disposed driving and driven shafts, means for maintaining the bodies in frictional engagement, means for separating the bodies, a pressure vessel associated with one of the bodies, and means operable by the heating of the pressure vessel due to slipping of the friction surfaces of the bodies for releasing the engaging means and thereby enabling automatic operation of the separating means.

4. A friction coupling comprising a driving body and a driven body mounted for rotation with coaxially-disposed driving and driven shafts, means for maintaining the bodies in frictional engagement, means for separating the bodies, a fuse associated with one of the bodies and adapted to melt in the event of heating due to slipping of their surfaces, and means controlled by the fuse for releasing the engaging means and thereby enabling automatic operation of the separating means.

5. A friction coupling comprising a driving body and a driven body mounted for rotation with coaxially-disposed driving and driven shafts, means for maintaining the bodies in frictional engagement, means for separating the bodies, a thermostat associated with one of the bodies and influenced by heating due to slipping of their surfaces, and a circuit controlled by the thermostat for releasing the engaging means and thereby enabling automatic operation of the separating means.

6. A friction coupling comprising a driving body, a driven body, electromagnetic means for maintaining the bodies in frictional engagement, temperature sensitive means associated with one of the bodies, and means controlled by the temperature sensitive means for releasing the electromagnetic engaging means in the event of heating of the friction surfaces of the bodies due to slipping.

7. A friction coupling comprising a driving body, a driven body, electromagnetic means for maintaining the bodies in frictional engagement, a pressure vessel associated with one of the bodies, and means operable by the heating of the pressure vessel due to slipping of the friction surfaces of the bodies for releasing the electromagnetic engaging means.

8. A friction coupling comprising a driving body, a driven body, electromagnetic means for maintaining the bodies in frictional engagement, a fuse associated with one of the bodies and adapted to melt in the event of heating due to slipping of their surfaces; and means controlled by the fuse for releasing the electromagnetic engaging means.

9. A friction coupling comprising a driving body, a driven body, electromagnetic means for maintaining the bodies in frictional engagement, a thermostat associated with one of the bodies and influenced by heating due to slipping of their surfaces, and a circuit controlled by the thermostat, for releasing the electromagnetic engaging means.

10. In a friction coupling having a driving body, a driven body, and electromagnetic means for maintaining said bodies in frictional engagement, means for automatically effecting disengagement on heating of the friction surfaces by slipping of said surfaces, said means comprising an enclosed pressure vessel associated with one of the bodies, an electric relay circuit, an electric contact associated with the vessel for closing the relay circuit at a predetermined temperature of the vessel, and a relay connected with the relay circuit for effecting the de-energizing of the electromagnetic means.

11. In a friction coupling having a driving body, a driven body, electromagnetic means for maintaining said bodies in frictional engagement, and a supply circuit to the electromagnetic means incorporating a safety device, means for automatically effecting disengagement on heating of the friction surfaces by slipping of said surfaces, said means comprising a thermo-element associated with one of the bodies and adapted when subjected to a predetermined temperature rise to short the supply circuit, whereby the safety device is operated to de-energize said circuit.

12. In a friction coupling having a driving body, a driven body, and electromagnetic means for maintaining said bodies in frictional engagement, means for automatically effecting disengagement on heating of the friction surfaces by slipping of said surfaces, said means comprising an enclosed pressure vessel associated with one of the bodies and having a liquid of known vaporization temperature therein, a pressure-controlled member enclosing said liquid, an electric relay circuit, an electric contact connected with said member for closing the relay ciruit on the vaporization of the liquid, and a relay connected with the relay circuit, for effecting the de-energizing of the electromagnetic means.

13. In a friction coupling having a driving body, a driven body, and electromagnetic means for maintaining said bodies in frictional engagement, means for automatically effecting disengagement on the heating of the friction surfaces by slipping of said surfaces, said means comprising a heat-sensitive device associated with one of the bodies, an electric relay circuit, an electric contact associated with the said device for closing the relay circuit at a predetermined temperature of the said surface, and a relay connected with the relay circuit for effecting the de-energizing of the electromagnetic means.

JULIUS BING.